June 29, 1965 R. W. DODGE 3,191,712
DEMOUNTABLE CAB CONSTRUCTION FOR A TRACTOR WITH
A FRONT-MOUNTED IMPLEMENT OR TOOL
Filed March 21, 1963 4 Sheets-Sheet 1

Inventor:
Robert W. Dodge,
by Munn H. Hamilton
Attorney

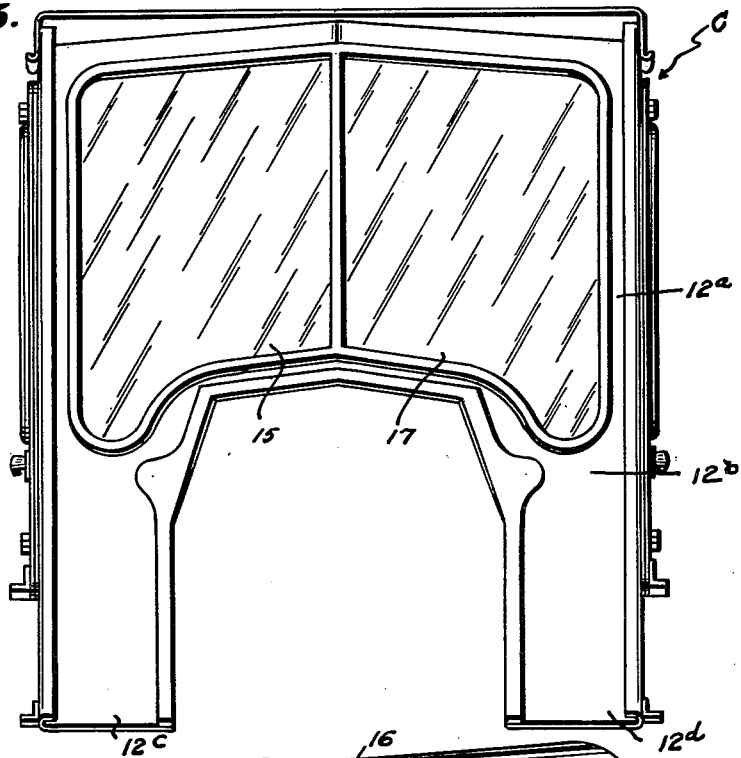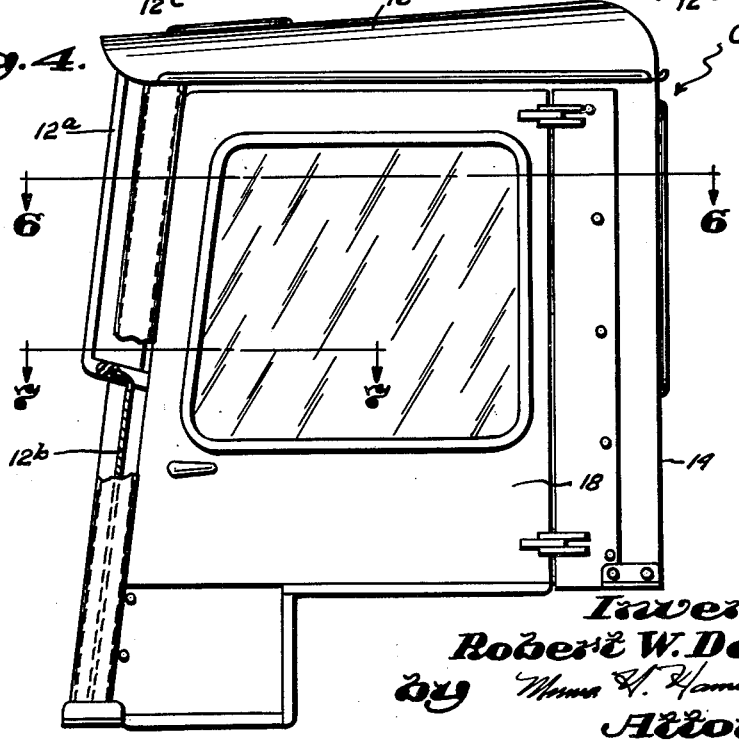

June 29, 1965    R. W. DODGE    3,191,712
DEMOUNTABLE CAB CONSTRUCTION FOR A TRACTOR WITH
A FRONT-MOUNTED IMPLEMENT OR TOOL
Filed March 21, 1963    4 Sheets-Sheet 3

Inventor:
Robert W. Dodge,
by Munn H. Hamilton Attorney

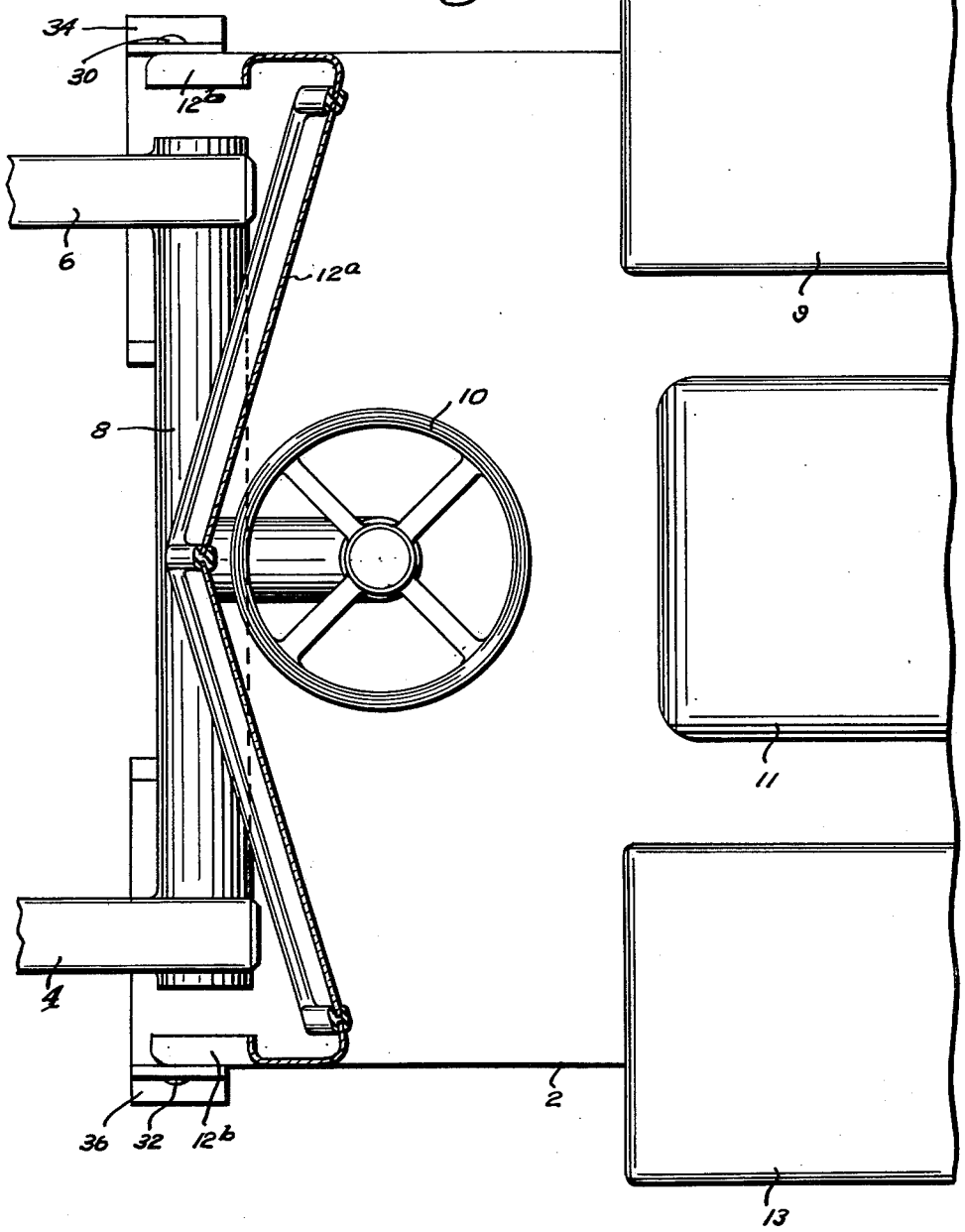

United States Patent Office 3,191,712
Patented June 29, 1965

3,191,712
DEMOUNTABLE CAB CONSTRUCTION FOR A TRACTOR WITH A FRONT-MOUNTED IMPLEMENT OR TOOL
Robert W. Dodge, 40 Pleasant St., Wenham, Mass.
Filed Mar. 21, 1963, Ser. No. 266,881
2 Claims. (Cl. 180—89)

This invention relates to an improved demountable cab construction for tractors of the general class having a pair of power arms arranged to move forwardly and rearwardly at either side of the tractor body, together with a connecting shaft transversely secured between the ends of the power arms.

In constructing a demountable cab body for a tractor of the class indicated, it will be understood that it is necessary to maintain a clearance for the power arms and connecting shaft to travel back and forth into various operating positions. This results in limited cab space in which an operator can sit and manipulate the steering wheel and other controls. The operator also has difficulty in looking out over the forward end of the tractor during earth-moving operations and other activities. Because of this power arm arrangement, as well as other mechanism which is required to be serviced in the tractor below the floor of the cab, and at other points, seating space is very limited and a relatively norrow entrance or "walk-in" area at either side of the cab body is present.

It is an object of the present invention to provide an improved demountable cab construction which provides more room for the operator and which can be quickly and conveniently mounted on a tractor body of the class indicated.

Still another object is to combine a maximum of visibility and working area within a cab body with adequate clearance provision for movement of the power arm and connecting shaft mechanism.

A further object of the invention is to provide in a cab body a windshield enclosure arrangement which provides for greater steering wheel area.

Still another object is to provide a novel arrangement of cab wall components which provide a rigid cab frame having relatively large walk-in areas at either side thereof to facilitate entering and leaving the cab.

The nature of the invention and its other objects and novel features will be more fully understood and appreciated from the following description of a preferred embodiment of the invention selected for purposes of illustration and shown in the accompanying drawings, in which:

FIGURE 3 is a front elevational view of the structure shown in FIGURES 1 and 2;

FIGURE 4 is a side elevational view of the cab body indicating a portion of one of the corner structures broken away at one point;

FIGURE 7 is a cross section taken on the line 7—7 of FIGURE 4.

Figure 1:
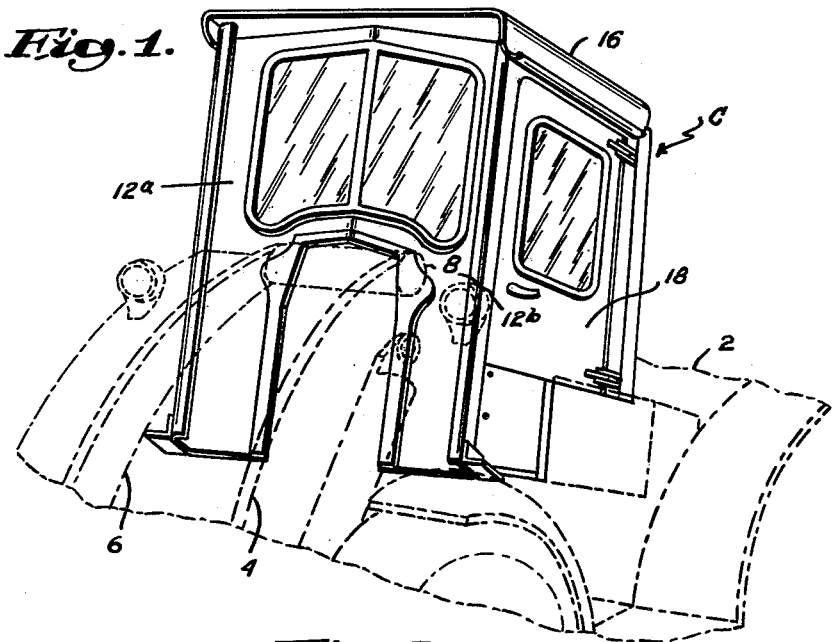
FIGURE 1 is a perspective view of the cab body of the invention shown in association with portions of a tractor indicated in dotted lines.
Figure 2:
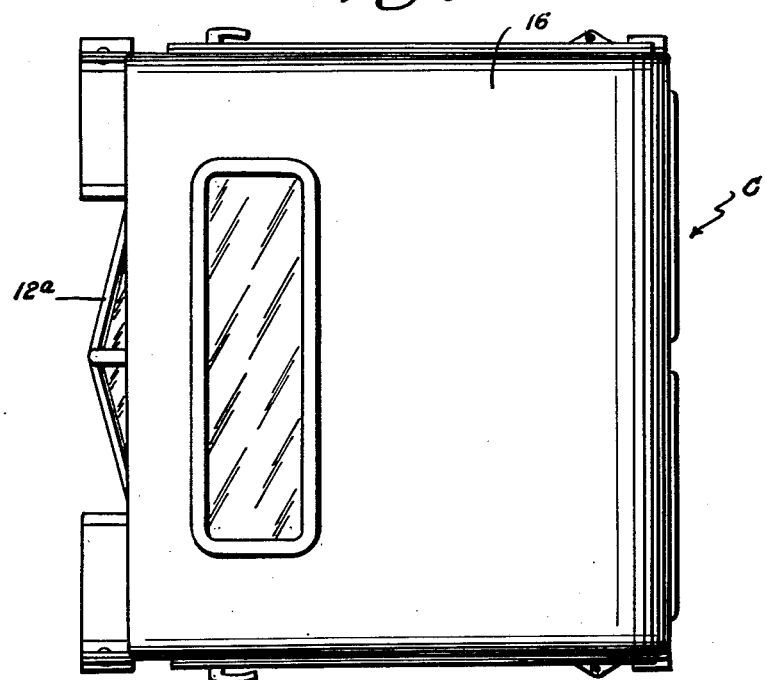
FIGURE 2 is a plan view of the cab body of the invention.
Figure 5:
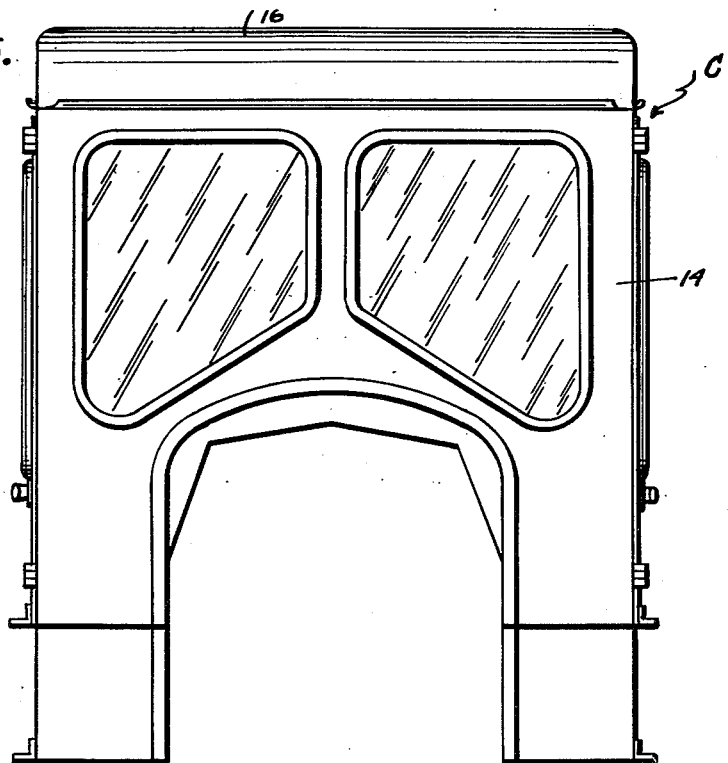
FIGURE 5 is a rear elevational view.
Figure 6:
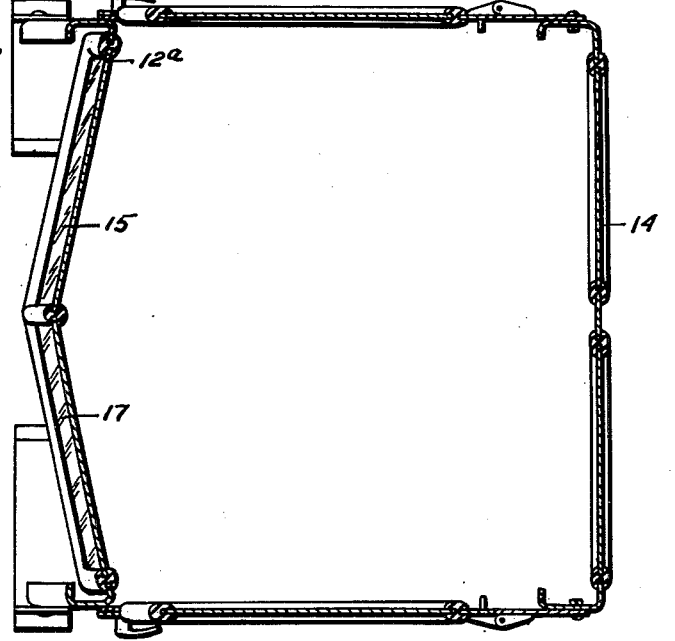
FIGURE 6 is a cross section taken on the line 6—6 of FIGURE 4.

In the structure shown in the drawings, numeral 2 denotes a tractor body which is indicated in dotted lines in FIGURE 1 and which is of the general class having a pair of power arms 4 and 6. These arms are also indicated fragmentarily in FIGURE 7. As is customary with machines of this class, the power arms are connected together by a transversely disposed shaft 8 which extends across a substantial part of the tractor body (FIGURE 7). Numeral 10 refers to a steering wheel centrally located in the tractor body 2 in which position an operator sitting behind the wheel 10 may look forwardly between the arms 4 and 6 to observe working conditions and to facilitate handling a shovel, blade, or other tractor accessory which is employed at the front of the tractor body.

It is pointed out, that in conventional arrangements of cab structures heretofore utilized with tractors of this class wherein there is employed a front cab wall extending straight across the tractor in back of the arms, a sharply restricted seating area is present. This results from the fact that it is necessary to maintain clearance into and out of which the arms and shaft 8 may move. Such an arrangement also restricts the space available for access to the sides of the cab or so-called "walk-in" areas. These conditions also tend to locate the operator, who is behind the wheel 10 in a rather restricted space adjacent to other tractor components 9, 11 and 13. Moreover, if hinged doors are used the "walk-in" area at either side of the tractor is still further reduced and accessibility is poor for servicing parts of the tractor below the cab floor.

In the present invention, I provide a specially designed cab body which greatly reduces the difficulty noted. As shown in the drawings, I construct a cab body C of some suitable material such as sheet metal of which steel is an example. This cab structure preferably is made up of a front, a back, a top and side enclosures. These parts may, for example, be separately cut and formed and then secured to one another in any desired manner as by welding, use of fastenings, or other means.

Numerals 14, 16 and 18 denote the back, top and sides respectively. The front of the cab includes several novel features of the invention and is specially formed with an upper window enclosure section 12a having windows 15 and 17 and a lower tractor engaging section 12b. These parts may be more clearly seen from an inspection of FIGURES 1 and 3. As noted therein the lower section 12b has a central portion cut away to form two depending corner legs 12c and 12d which are designed to straddle the upper portion of the tractor in the manner diagrammatically suggested in FIGURE 1.

In accordance with the invention, the lower section 12b is set back from the upper section 12a a substantial distance as illustrated in FIGURE 4. There is thus provided a recessed area into which the connecting shaft 8 may be received in its rearmost loading position. I further construct the upper section 12a with two window panels or enclosures which, as shown in FIGURE 7, intersect one another to form a V-shaped structure which overhangs the connecting shaft 8 and projects forwardly directly in front of the steering wheel 10. By means of this arrangement, it will be observed that more room is made available and the operator in the cab can sit or lean forwardly in a position such that he has a much greater range of viewing between the power arms even when the shaft 8 is in its rearmost position. Moreover, the V-shaped enclosure provides greater room and accessibility for operating the steering wheel and other controls near the operator.

In order to realize these advantages and at the same time provide for adequate "walk-in" areas at the sides of the tractor, I have further arranged the channel shaped legs 12c and 12d to occur in a forwardly projected position relative to shaft 8. This is accomplished by forming outer edges of the V-shaped front 12a of the cab, together with outer edges of the depending leg portions 12c and 12d in a special reversely bent manner so that these edges, although located in spaced relation to opposite ends of the shaft 8, are nevertheless projected forwardly and secured at points well ahead of respective shaft extremities. Thus it becomes possible to gain space for the side enclosures and since the doors may be inclined forwardly, as shown in the drawings, greatly improved "walk-in" areas are provided. The channel shaped portions of the depending legs 12c and 12d also constitute convenient means for receiving bolts 30 and 32 which are fastened into brackets 34 and 36.

Attention is also directed to the fact that the outer edges when thus reversely folded upon themselves form channel shaped sectional corners which impart rigidity and strength to the entire cab body and constitute in effect front door frame portions.

It is intended that the combination of a recessed lower front section and an upper overhanging window section, both of which parts are reversely bent upon themselves to provide novel corner sections may be employed with various types of tractors of the general class described and the parts noted may be modified in shape or size in order to conform to different tractor bodies within the scope of the appended claims.

I claim:

1. In a tractor assembly of the class described having a steering column and a steering wheel therefor, said tractor having mounted thereon at its front end an implement, and including power arms arranged to move forwardly and rearwardly at each side of the tractor together with a connecting shaft member transversely secured between the rear extremities of the power arms, in combination, a cab body for said tractor comprising a front portion, a back portion and a top, together with side enclosure means, said front portion including an upper section and a lower section, said lower section being downwardly and forwardly inclined to extend rearward of said connecting shaft member and being centrally recessed to define depending legs which straddle medial portions of said tractor assembly and constitute front corner braces, said upper section including a pair of forwardly converging and intersecting window panels forming a V-shaped windshield enclosure which projects forwardly above the connecting shaft member and define an enlarged steering wheel area receiving the adjacent portions of the steering wheel, the opposite outer edges of the upper and lower front sections being bent forwardly to form angularly disposed outer walls which occur in spaced relation to respective opposite ends of the connecting shaft member and which are projected forwardly beyond the extremities of said connecting shaft member.

2. The invention set forth in claim 1 characterized in that the upper section which includes a pair of forwardly converging and intersecting window panels forming a V-shaped windshield is offset forwardly of the lower section and the angularly disposed outer walls terminate in inwardly projecting flanges.

References Cited by the Examiner

UNITED STATES PATENTS

| D. 184,043 | 12/58 | Dodge. | |
|---|---|---|---|
| 2,430,442 | 11/47 | Acheson | 296—102 |
| 2,583,918 | 1/52 | Wilson | 296—28 X |
| 2,795,458 | 6/57 | Wieschel | 296—102 |

A. HARRY LEVY, *Primary Examiner.*